United States Patent
Kress et al.

(10) Patent No.: US 6,926,475 B2
(45) Date of Patent: Aug. 9, 2005

(54) TOOL FOR MACHINING WORKPIECES

(75) Inventors: Dieter Kress, Aalen (DE); Friedrich Häberle, Lauchheim (DE)

(73) Assignee: Mapal Fabrik Für Präzisionswerkzeuge Dr. Kress AG (DE)

( * ) Notice: Subject to any disclaimer, the term of this patent is extended or adjusted under 35 U.S.C. 154(b) by 0 days.

(21) Appl. No.: 10/443,226

(22) Filed: May 22, 2003

(65) Prior Publication Data

US 2003/0217632 A1 Nov. 27, 2003

(30) Foreign Application Priority Data

May 23, 2002 (DE) .......................... 102 23 687
Aug. 16, 2002 (DE) .......................... 102 37 680

(51) Int. Cl.[7] .............................................. B23B 51/00
(52) U.S. Cl. ..................... 408/156; 408/153; 408/161
(58) Field of Search ................................ 408/153, 154, 408/155, 156, 159, 161

(56) References Cited

U.S. PATENT DOCUMENTS

| | | | |
|---|---|---|---|
| 2,093,742 A | 9/1937 | Staples | 77/76 |
| 2,093,986 A | 9/1937 | Staples | 77/76 |
| 3,230,798 A * | 1/1966 | Toth et al. | 408/229 |
| 5,304,019 A * | 4/1994 | Klee et al. | 408/156 |
| 6,270,295 B1 * | 8/2001 | Hyatt et al. | 408/1 R |
| 6,729,810 B2 * | 5/2004 | Hyatt et al. | 408/1 R |

FOREIGN PATENT DOCUMENTS

| | | |
|---|---|---|
| DE | 1915769 | 5/1965 |
| FR | 1018990 | 5/1950 |

* cited by examiner

*Primary Examiner*—Derris H. Banks
*Assistant Examiner*—Ali Abdelwahed
(74) *Attorney, Agent, or Firm*—Ostrolenk, Faber, Gerb & Soffen, LLP (57) ABSTRACT

A tool for machining workpieces, having a parent body which can be expanded at least zonally, having at least one geometrically defined cutting edge projecting beyond a circumferential surface of the tool, and having a setting device influencing the radial distance of the cutting edge from the center axis of the tool. The setting device has a setting element, and an adjusting device which sets the degree of bending of the setting element. The setting element is inserted into the parent body of the tool in such a way that, when the bending of the setting element is varied, the radial distance of the cutting edge is varied.

16 Claims, 7 Drawing Sheets

TOOL FOR MACHINING WORKPIECES

BACKGROUND OF THE INVENTION

1. Field of the Invention

The invention relates to a tool for machining workpieces having a parent body which can be expanded at least in selected zones thereof, having at least one geometrically defined outer cutting edge projecting beyond a circumferential surface of the tool, and having a setting device that sets the radial distance of the cutting edge from the center axis of the tool.

2. Related Art

Tools of this type are known. They serve to remove chips from a workpiece by means of a cutting edge, for example during the surface machining of bores. As a rule, the tool is set in rotation in order to produce a relative movement between the cutting edge and the workpiece surface to be machined and in order to remove chips. However, it is also possible to set the workpiece in rotation and to clamp the tool in a rotationally fixed position.

Tools which have a setting device, by means of which the position of the circumferential cutting edge of the tool can be set relative to its center axis, are also known. The known tools may have, for example, rings of cutting edges, but also, for example, may be monoblock tools. In each case, the setting device has a setting element which is designed as a cone and is part of a wedge mechanism. By displacement of the cone, the ring of cutting edges or the parent body of the monoblock tool can be expanded to a greater or lesser extent in order to vary the position of the cutting edge. For adjusting the cutting edge, the cone is displaced in the direction along the center axis of the tool and interacts with an inner conical surface of the ring of cutting edges or of the tool. There are high frictional forces between the surface and the cone, so that fine adjustment of the cone is often not possible. As a result, it is often not possible to realize an exact setting, or it is possible only at an increased production cost. Furthermore, high setting forces are required in order to set the position of the cone. It has also been found that a displacement of the cutting edge is not reversible in many cases.

SUMMARY OF THE INVENTION

The invention therefore provides a tool which does not have these disadvantages.

According to an aspect of the invention, a tool for machining workpieces, having a parent body which can be expanded at least zonally, having at least one geometrically defined cutting edge projecting beyond a circumferential surface of the tool, and having a setting device that sets the radial distance of the cutting edge from the center axis of the tool, wherein the setting device has a setting element and an adjusting device varying the bending of the setting element, and wherein the setting element is disposed in the parent body of the tool in such a way that, when the bending of the setting element is varied, the diameter of the parent body is varied, so that the radial distance of the at least one cutting edge from its center axis is varied. It is possible to vary the bending of the setting element in a very sensitive manner. The setting element itself does not generate any substantial frictional forces during the change in the bending of the setting element. Furthermore, it is possible, when the parent body of the tool is expanded, for this expansion to be made reversible, by the change in the bending of the setting element likewise being made reversible. A reversible setting of the position of the cutting edges is thus also possible.

In various embodiments of the invention, the setting element may be planar in its initial position before being influenced by the adjusting device. The setting element may further be curved, either concave or convex.

The parent body of the tool preferably has an abutment which prevents a displacement of the setting element in the direction along the center axis and on which the setting element is supported when the adjusting device is actuated. The abutment advantageously comprises a welded connection between the setting element and the parent body.

The setting element may be made of spring steel.

The setting element may influence one, more than one, or all of the cutting edges of the tool.

According to embodiments of the invention, the radial distance of the cutting edge may be either increased or reduced by the setting element. In other embodiments, the setting element may only be operable to reduce the radial distance. A single same setting element may serve both to increase and reduce the radial distance of the cutting edge.

The adjusting device may comprise an adjusting screw, and further may comprise both an adjusting screw and a clamping screw.

Other features and advantages of the present invention will become apparent from the following description of embodiments of the invention, which refers to the accompanying drawings.

BRIEF DESCRIPTION OF THE DRAWINGS

The invention is explained in more detail below with reference to the drawings, in which.

DETAILED DESCRIPTION OF EMBODIMENTS OF THE INVENTION

Figure 1:
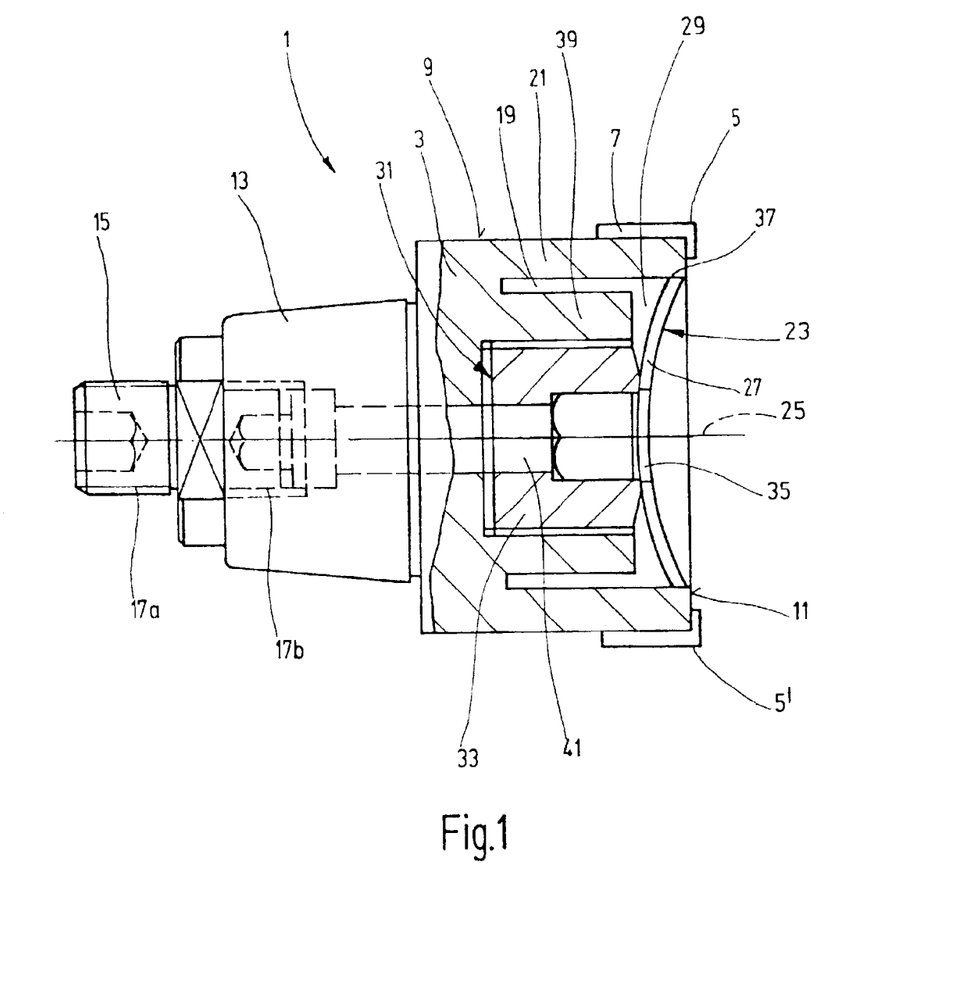
FIG. 1 shows a first exemplary embodiment of a tool having a setting device which comprises a concavely curved setting element.

FIG. 1 shows a tool 1 for machining workpieces, having a parent body 3 which is provided with at least one geometrically defined cutting edge 5, for removing chips from a workpiece. The cutting edge 5 may be part of the parent body 3. In the exemplary embodiment shown here, the cutting edge 5 is part of a cutting tip 7 which is inserted into the parent body 3. The fastening of cutting tips 7 to a parent body 3 of a tool 1 is known. As a rule, the cutting tips 7 are inserted into a groove, so that they are securely held and the forces produced during the machining of workpieces are directed into the parent body 3. The cutting tips can be brazed in place in the parent body 3 or can be clamped in place therein by means of known clamping shoes. Finally, it is also possible to fasten the cutting tips to the parent body 3 directly with a screw or thread.

Two opposite cutting edges 5 and 5' are shown in FIG. 1. It is possible to provide more than two cutting edges on the parent body 3; the number of cutting edges may be matched to the application of the tool. It is also possible to insert one or more guide strips (not shown) into the circumferential surface 9, by means of which guide strips the tool 1 is supported on a bore surface if said tool 1 is used for machining bores in workpieces. The implementation and arrangement and also the fastening of guide strips are known, so that this need not be dealt with further here.

FIG. 1 clearly shows that the cutting edge 5 and the cutting edge 5' project radially outwards beyond the circumferential surface 9. In the exemplary embodiment shown here, the cutting edges 5, 5' also project beyond the end face 11 of the tool 1.

Here, by way of example, the tool 1 is provided with a conical extension 13, with which it can be fastened to a tool holder, an intermediate piece or directly to a machine tool. Provided here is a clamping screw 15 which, as known, is provided with thread sections 17a, 17b running in opposite directions, serving to clamp the tool 1 in place.

The parent body 3 of the tool 1 can be expanded at least zonally. This can be realized by regions, in particular those in which a cutting edge 5 or 5' is provided, having slots permitting these regions to move in an elastic manner relative to the parent body 3. In the exemplary embodiment shown here, a groove 19 is incorporated in the end face 11, so that an annular wall region 21 is formed outside the groove 19, the cutting edges 5, 5' being disposed on or in this wall region 21.

The configuration of the wall region 21 can be matched to the intended range of use. The wall region 21 may be provided with radial grooves and/or slots in order to influence its expansion behavior. At the same time, it is possible to design certain areas of the wall region to be more flexible in order to influence the radial displacement of the cutting edges 5, 5'.

The tool 1 is provided with a setting device 23 which serves to bring the cutting edges 5, 5' into a predetermined position relative to the center axis 25 of the tool 1. The setting device, on the one hand, serves for the exact initial setting of the position of the cutting edges 5, 5' relative to the center axis 25 but also serves, in the event of wear of the cutting edges 5, 5', to reset their position in order to realize a desired machining diameter of the tool 1.

The setting device 23 has a curved setting element 27. In the exemplary embodiment shown here, the setting element 27 is curved concavely inward into a cavity 29 of the tool 1. The setting element 27 interacts with an adjusting device 31 which influences the curvature of the setting element 27. Here, the adjusting device 31 has an adjusting screw 33 which is accommodated in the cavity 29 in the parent body 3 of the tool 1 and is accessible via the end face 11 via an aperture 35 in the setting element 27 so that it can be screwed to a greater or lesser extent into or out of the parent body 3.

In a first functional position, the adjusting screw 33 bears against the inside, facing the cavity 29, of the setting element 27. If the adjusting screw 33 is set in rotation, it rotates about the center axis 25 and—given an appropriate direction of rotation of the screw—influences the bending of the setting element 27. If, for example, the adjusting screw 33 is displaced to the right (as seen in the figure) along the center axis 25, the bending of the setting element 27 is reduced and the wall region 21 is expanded.

In order to be able to vary the bending of the setting element 27, an abutment 37 is provided on the parent body 3, that is to say on the wall region 21 in this case, by means of which abutment 37 the setting element 27 is held on the parent body 3 in such a way that an axial displacement of the setting element 27 in the region of the abutment 37 is avoided.

The abutment 37 may be formed by a projection which projects inward from the wall region 21 in the direction of the center axis 25 and prevents a displacement of the setting element 27 to the right, that is to say, out of the cavity 29.

The abutment 37 may also be realized by the setting element 27 being snapped into an encircling groove which is incorporated in the inner surface of the wall region 21. Finally, it is possible to weld the setting element 27 to the inner surface of the wall region 21, preferably by a laser welding process, a factor which permits simple fastening of the setting element 27, in particular in the case of small dimensions of the tool 1.

In the exemplary embodiment shown in FIG. 1, the adjusting screw 33 is provided with an external thread which is preferably designed as a fine thread and which interacts with a wall section 39 which lies inside the groove 19 and contains a corresponding internal thread. In addition, the adjusting screw 33 is provided with a passage 41, which in this case is arranged concentrically to the center axis 25. It is thus possible in principle to realize a coolant/lubricant feed through the adjusting screw 33 and through the aperture 35 of the setting element 27.

Figure 2:
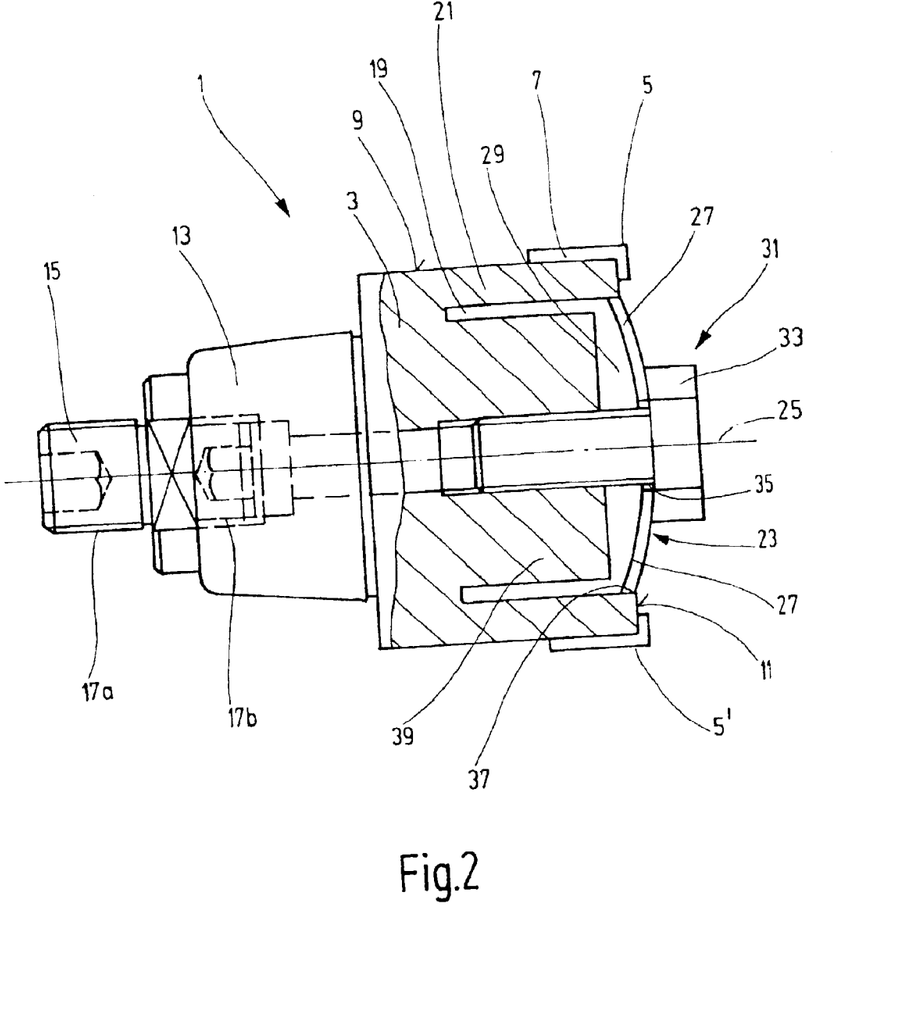
FIG. 2 shows a second exemplary embodiment of a tool having a setting device which comprises a convexly curved setting element.

FIG. 2 shows a modified exemplary embodiment of the tool 1. The same parts are provided with the same designations, so that reference is made in this respect to the description with regard to FIG. 1.

A feature of the tool 1 according to FIG. 2 lies in the differing configuration of the setting element 27. Here, the latter is arched convexly outward. In this case it projects beyond the end face 11. However, it is possible to design the cavity 29 to be so deep that the setting element can be accommodated completely in said cavity 29. The setting element 27 interacts with an adjusting screw 33 of the setting device 23, the adjusting screw 33 acting from the outside, that is to say from that side of the setting element 27 which faces away from the cavity 29. By displacing the adjusting screw to the left in the direction of the center axis 25, the arching of the setting element 27 is reduced, so that the latter expands the wall region 21 and thus displaces the cutting edges 5, 5' outward relative to the center axis 25.

In order to ensure the functioning of the setting device 23, the setting element 27 is again supported on an abutment, which is provided on the inner surface of the wall region 21 and prevents a displacement of the setting element 27 in the direction along the center axis 25. It can easily be seen that the abutment may take many forms, including without limitation a projection which projects into the cavity 29, a groove incorporated in the inner surface of the wall region 21 in which the setting element 27 can engage, and a welded connection provided between the setting element 27 and the parent body 3, that is, a welded connection to the wall region 21 of the tool 1. In this case, the setting element 27 may be welded continuously in the contact region between setting element 27 and parent body 3, or in only a portion of that region. A laser welding process can preferably be used.

The adjusting screw 33 has a screw head, seated on the outside of the setting element 27, and a screw shank which projects through the aperture 35 in the setting element 27 and engages in the wall section 39 by means of an external thread.

Figure 3:
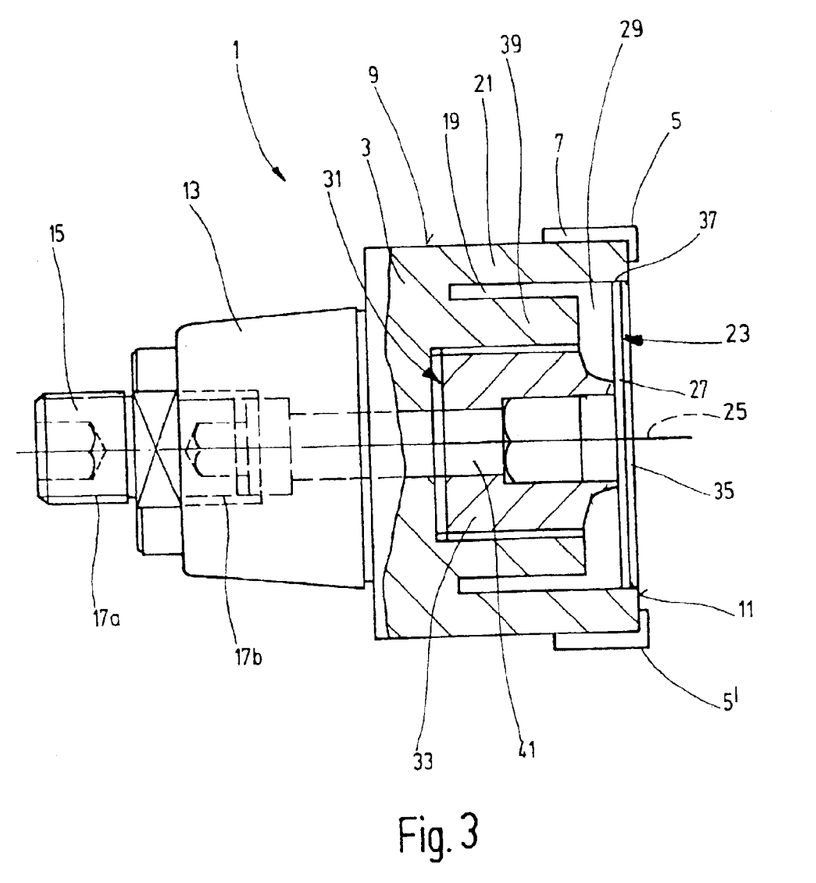
FIG. 3 shows a third exemplary embodiment of a tool having a setting device which comprises a planar setting element.

FIG. 3 shows another modified exemplary embodiment of a tool 1 which corresponds in several of its parts to that shown in FIG. 1. The same designations correspond to the same parts, so that reference is made in this respect to the description with regard to FIG. 1.

A feature of the tool 1 shown in FIG. 3 is that the setting device 23 has a planar setting element 27. The outside diameter of the planar setting element 27 is selected in such a way that the cutting edges 5, 5' of the cutting tips 7, 7' lie initially on an outside diameter which is greater than the outside diameter desired during use of the tool 1. Then, the setting element 27 is bent more or less outward or inward by means of the adjusting device 31, so that the outside diameter of the setting element 27 is reduced and thus the cutting tips 7; 7' and the cutting edges 5, 5' are pulled inward. The adjusting device 31 is actuated in such a way that the originally planar setting element 27 is thus bent until the cutting edges 5; 5' lie on the desired specified diameter of the tool 1.

Thus, the desired outside diameter of the tool 1 is obtained by bending the originally planar setting element 27 so as to set the cutting edges 5, 5'. Then, in the event of wear of the cutting edges 5, 5', they may be reset by reducing the degree of bending of the setting element, so that the cutting edges 5, 5' are displaced outward by the setting element 27 until the desired specified diameter of the tool 1 is reproduced.

It is of course also possible to also use a planar setting element 27 in combination with the exemplary embodiment shown in FIG. 2, in other words to provide an adjusting screw 33 acting on the setting element 27 from the outside. It is thus found that a planar setting element 27 can be varied in its bending both with an adjusting screw 33 acting from the inside, as has been explained with reference to FIGS. 1 and 3, and by an adjusting screw 33 lying on the outside, which has been described with reference to FIG. 2.

It is therefore not necessary for the setting element 27 in the setting device 23 to be bent from the outset. A planar setting element 27 may also be used, as has been described with reference to FIG. 3. In this case, however, the outside diameter of the setting element 27 is selected in such a way that the tool 1 and its cutting edges 5, 5' initially have an oversized diameter, and then the cutting edges are brought to the desired spacing by the bending of the setting element 27.

Figure 4:
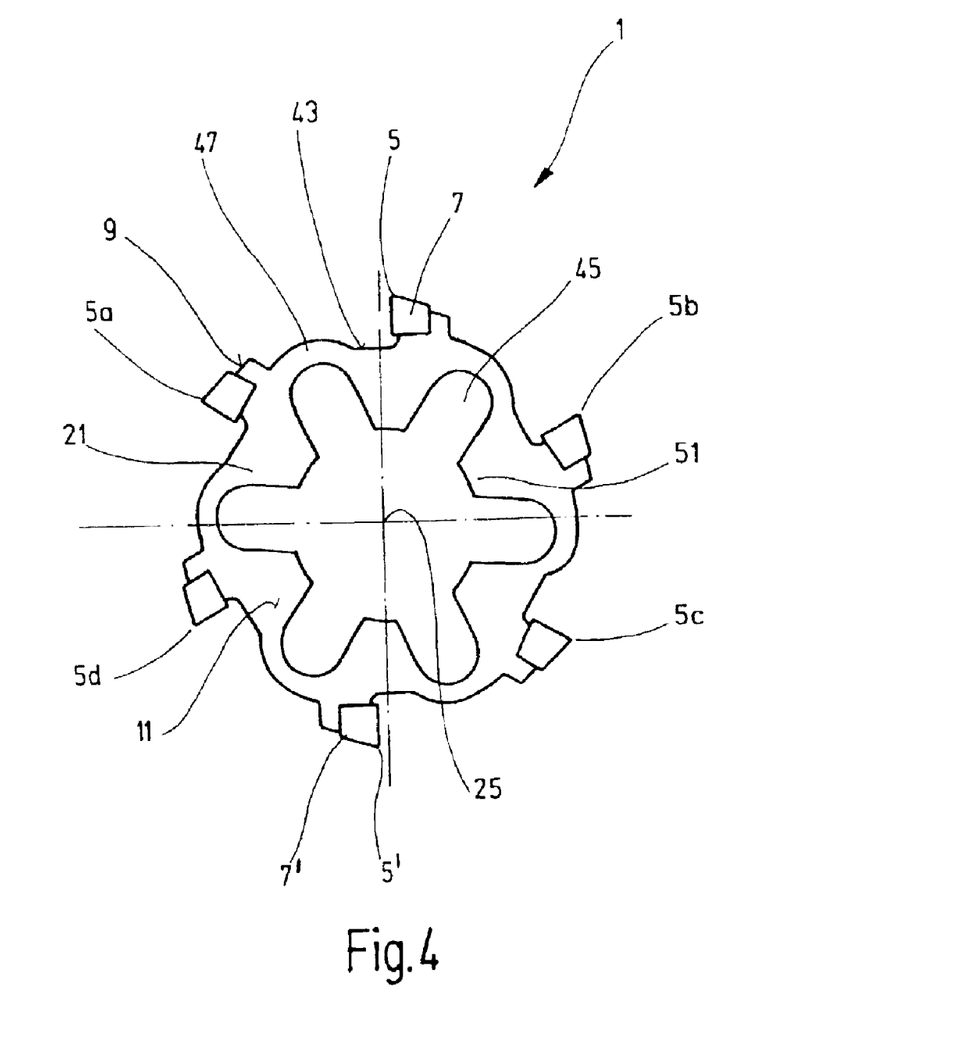
FIG. 4 shows a schematic end view of an embodiment of the tool.

FIG. 4 schematically shows a possible embodiment of the wall region 21 in a plan view of the end face 11 of the wall region 21. For reasons of clarity, the setting device 23 has been omitted here.

FIG. 4 shows that, in addition to the cutting edges 5 and 5' on the cutting tips 7 and 7', further cutting edges 5a, 5b, 5c, 5d may be provided, and these further cutting edges 5a, 5b, 5c, 5d project beyond the circumferential surface 9 of the tool in the radial direction and assume a defined position relative to the center axis 25. In addition to, or instead of, one cutting edge or a few cutting edges, the wall region 21 may be provided with at least one guide strip, which is not shown here.

The wall region 21 is provided from outside with depressions 43 which serve as chip spaces, one chip space being assigned to each cutting edge for removing the chips produced during the machining of a workpiece. Here, a plurality of recesses 45 are incorporated in the wall region 21 from the inside, these recesses 45 in each case lying between two adjacent cutting edges, that is, between the cutting edge pairs (5, 5b), (5b, 5c), (5c, 5'), (5', 5d), (5d, 5a) and (5a, 5). Thus, relatively thin connecting regions 47 are formed between adjacent cutting edges or cutting tips, these connecting regions 47 permitting a radial displacement of the cutting tips or cutting edges relative to the center axis 25.

It becomes clear from the illustrations according to FIGS. 1 and 2 that the setting device 23 has a curved setting element 27, the bending of which can be influenced by an adjusting device 31. Here, the adjusting device 31 has an adjusting screw 33 which acts on the setting element 27 close to the center axis 25. The contact area of the adjusting screw 33, 33' is preferably matched to the contact area of the setting element 27 in order to avoid point-like contact.

It can be seen from FIGS. 1 and 2 that, by displacing the adjusting screw 33, the bending of the setting element 27 can be adjusted, and that axial displacement of the setting element 27 in the direction along the center axis 25 is prevented by securing the setting element 27 to the parent body 3 at the abutment 37. When the bending radius of the setting element 27 is increased, for example, the extent of said setting element 27 measured perpendicularly to the center axis 25 in the figures increases, so that the parent body 3 of the tool 1, that is to say the wall region 21 in this case, is expanded and the radial position of the cutting edges 5, 5' relative to the center axis 25 is displaced radially outward.

The functioning of the setting device 23 having a planar setting element 27 has been explained with reference to FIG. 3. Here, therefore, the planar setting element 27 is bent in order to set the desired position of the cutting edges 5, 5'.

The setting element 27 is preferably made of spring steel. The variation in the bending, in particular during the fine setting of the position of the cutting edges 5, 5', is so small that the tool body, that is to say the wall region 21 in this case, and the setting element 27 are only elastically deformed, so that reversible deformation of the setting element 27 and of the wall region 21 is provided for. Thus, if the bending is first of all reduced by displacement of the adjusting screw 33, 33', that is to say if the wall region 21 is expanded, an increase in the bending of the setting element 27 and thus a reverse displacement of the cutting edges 5, 5' are also possible by reverse displacement of the adjusting screw 33. The reversible displacement of the cutting edges 5, 5', which is also provided for in the exemplary embodiment in FIG. 3, is thus based on the spring properties of the setting element 27, which ultimately acts like a bending beam.

However, it is also possible to couple the setting screw to the setting element in a double-acting manner. It is thus conceivable, given appropriate coupling between setting screw and setting element, to increase the bending of the setting element, that is to say to reduce the bending radius. Thus the cutting edges 5, 5' can also be displaced inward in the direction of the center axis 25 in an active manner by the setting device 23.

In principle, however, it is preferable, in order to simplify the construction of the setting device 23, to provide for only a reduction in the bending of the setting element 27 (an expansion of the cutting edges) by means of the setting device 31, in the exemplary embodiments in FIGS. 1 and 2.

Figure 5:
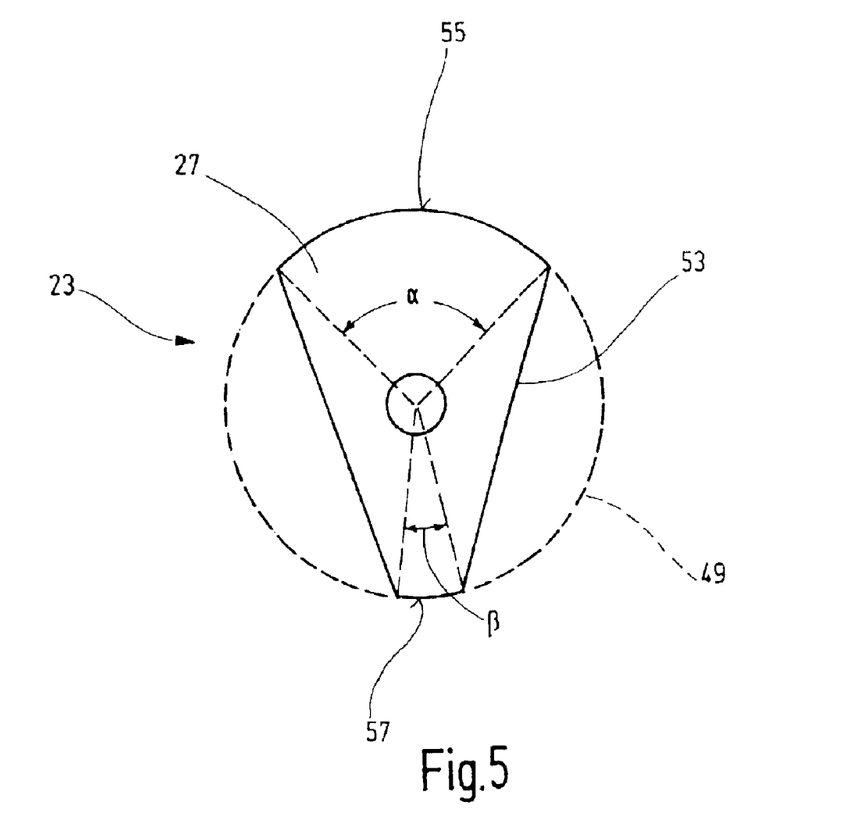
FIG. 5 shows a plan view of an exemplary embodiment of a setting element.

FIG. 5 schematically shows a plan view of a setting element 27 of a setting device 23. The setting element 27 is either arched concavely into the plane of the figure or arched convexly out of the plane of the figure, a factor which cannot be seen from FIG. 5. However, a planar setting element—as explained with reference to FIG. 3—can also be used here. The setting element 27 may be designed as a circular disk, a factor which is indicated by a broken line 49. The size of the setting element 27 depends on the dimensions of the wall region 21. For example, if FIG. 4 is viewed, thicker wall sections 51, which define the smallest inside diameter of the wall region 21, are seen between the recesses 45. If a setting element 27 according to FIG. 5 is therefore inserted into a tool 1 whose wall region is designed according to FIG. 4, the outside diameter of the setting element 27 would be established by the smallest inside diameter of the wall region 21, in particular by the inside diameter of the wall sections 51.

Given an appropriate configuration of the wall region 21, the setting element 27 can be fastened, for example being firmly welded, to the wall region 21 in the entire circumferential region, so that an encircling weld forms the abutment 37. If a disk-shaped setting element 27 is combined with a tool 1 which has a wall region 21 according to FIG. 4, contact regions are obtained between the wall region 21 and a disk-shaped setting element 27 only in the region of the wall sections 51, if the diameters are matched accordingly. An abutment 37 would have to be formed at least in some of these contact regions in order to prevent an axial displacement of the setting element 27 in the direction of the center axis 25 when the adjusting device 31 is activated. The setting element 27 is preferably connected to the parent body 3 of the tool 1 in each case in the region of the wall sections 51, that is to say in the region of the cutting edges 5, 5a, 5b, 5c, 5d, 5', so that, when the setting device 23 is activated, forces acting radially outward or inward are directed precisely at these locations into the wall region 21 in order to influence the position of the cutting edges.

A configuration of the setting element 27 differing from the disk shape is shown in FIG. 5 by solid lines 53. The top edge 55 of the setting element 27 extends over an arc of a circle having an opening angle α, measured from the center axis 25, of about 90°. The bottom edge 57 extends over an arc of a circle which corresponds to an opening angle β of slightly more than 20°. The extent of the top edge 55 or bottom edge 57, respectively, as viewed along the circle line, is freely selectable and can be matched to various configurations of the tool 1. It is thus possible, when the setting device 23 is actuated, to specifically apply a setting force only to sections of the wall region 21 which correspond to the top edge 55 or the bottom edge 57, respectively.

It is also possible, for example, to provide a virtually star-shaped setting element 27 which touches and applies a setting force to the wall region 21 only in the regions of the wall sections 51.

It is sufficient merely that the curved or planar setting element 27 can vary its bending radius under the effect of the adjusting screw 33 and thus can exert forces, acting radially, causing outward or inward movement of the wall region 21 and the cutting edges accommodated thereon.

It can be seen from FIG. 5 and the associated explanations that the setting element 27 can be freely designed. It is thus possible to provide an outer contour of the setting element 27 and an adapted inner contour of the parent body 3, in particular at the wall region 21, in order to effect any desired displacement of the cutting edges (see FIG. 4 for example).

Further, it is possible for the setting device 23 to displace respective cutting edges radially to an unequal extent. It is thus possible to displace one individual cutting edge or some of the cutting edges outward to a greater degree than others are displaced. Cutting edges which are displaced outward to a smaller degree can carry out the rough cutting during the machining of a workpiece, for example, whereas the cutting edges disposed further outward serve for the finish machining of the workpiece surface.

Figure 6:
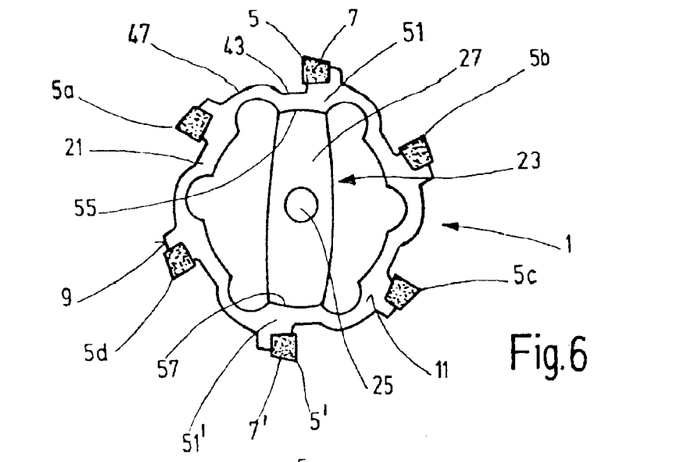
FIGS. 6 to 8 show further exemplary embodiments of a setting element inserted into a tool.

FIG. 6 shows a further exemplary embodiment of a setting element 27 inserted into a tool 1. The wall region 21 has been explained in more detail in particular with reference to FIG. 4. The same parts are provided with the same designations, so that reference is made to the description with regard to the preceding figures.

The wall region 21 is designed to be thinner overall than that explained with reference to FIG. 4. However, it is also decisive here that cutting tips which have cutting edges 5, 5a, 5b, 5c, 5d, 5' and are separated from one another by connecting regions 47 having a reduced wall thickness are inserted into the wall region 21. The cutting tips 7 and 7' which are arranged at the top and bottom in FIG. 6 can be displaced by means of the setting element 27. The setting element 27 has a top edge 55 designed in the shape of an arc of a circle and a correspondingly designed bottom edge 57. It touches the wall region 21, namely the wall sections 51, 51', only with the top and bottom edges 55, 57 of relatively narrow design, so that, when the setting element 27 is activated, only the wall sections 51 and 51' assigned to the cutting edges 7 and 7' are varied in their radial position.

The setting element 27 of the setting device 23 is designed to be relatively narrow, virtually in a strip shape, so that the setting forces which can be applied by the setting device 23 are limited by the width of the setting element 27.

Figure 7:
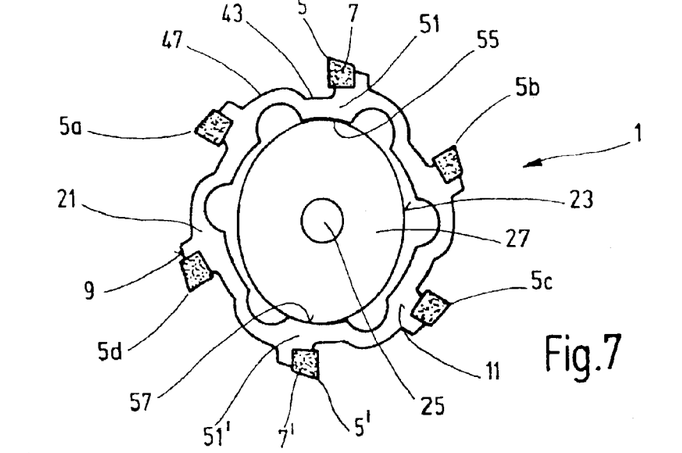

FIG. 7 shows a further exemplary embodiment of a setting device 23 having a setting element 27 which is inserted into a wall region 21 of a tool 1. Parts which correspond to preceding parts are provided with the same designations. In this respect, therefore, reference is made to the description with regard to the preceding figures.

A feature in FIG. 7 that is different from the exemplary embodiment shown in FIG. 6 is that the setting element 27 of the setting device 23 is designed to be essentially oval, here elliptical, the larger diameter of the ellipse being arranged vertically and the smaller diameter being arranged horizontally. The setting element 27 thus has a top edge 55 which is curved with a radius which is adapted to the radius of curvature of the inner surface of the wall section 51 above which the cutting edge 5 of the cutting tip 7 is arranged. Provided in a symmetrical manner at the bottom on the setting element 27 is a curved bottom edge 57, which touches that wall section 51' of the wall region 21 into which the cutting tip 7' having the cutting edge 5' is inserted.

It can easily be seen that the setting element 27 shown in FIG. 7 also touches the wall region 21 on its inner surface only in the wall sections 51 and 51', so that only the latter are moved radially outward—and if need be radially inward—when the setting element 27 is actuated. The wall sections assigned to the remaining cutting edges 5a, 5b, 5c and 5d are not touched by the setting element 27 and therefore are not varied in their position when the setting element is activated.

Figure 8:
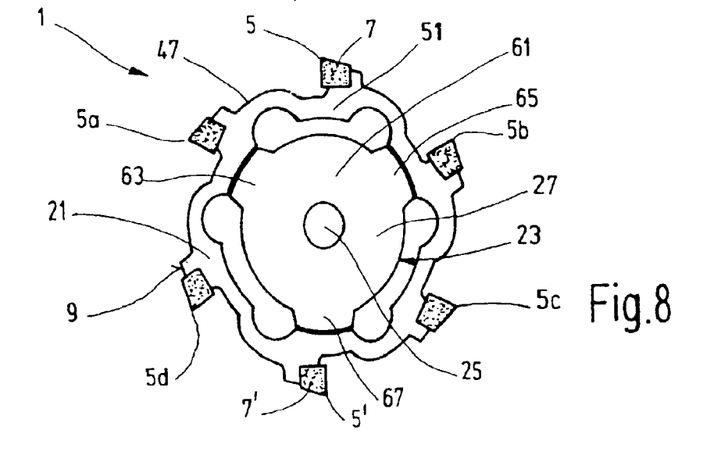

FIG. 8 shows a further exemplary embodiment of a setting element 27. Here, too, the same parts are provided with the same designations, so that reference is made to the preceding explanations.

Here, the setting element 27 of the setting device 23 has an approximately circular basic body 61 which comprises a number of projections 63, 65 and 67. The number and arrangement of the projections may be adapted to the desired setting behavior of the setting device 23. In the exemplary embodiment shown here, the wall section 21 of the tool 1 has six cutting edges 5, 5b, 5c, 5', 5d and 5a. The projections 63, 65 and 67 are arranged in such a way that they influence the radial position of only the cutting edges 5a, 5b and 5' when the setting device 23 is activated. To this end, the projections each have a rounded-off outer edge which is adapted to the inner surface of the wall element 21, in particular to the wall sections 51 which are assigned to the cutting edges 5a, 5b and 5'.

The setting elements 27 shown in FIGS. 6, 7 and 8 are connected, for example welded, to the wall region 21 in the region in contact with the latter, so that abutments 37, on which the setting element 27 of the setting device 23 is supported, are formed here in each case.

It becomes clear that, by the configuration of the setting element, individual cutting edges or a plurality of cutting edges of the tool 1 can be specifically set in their radial position relative to the center axis 25. Also, due to the varying configuration of the setting element 27, different amounts of setting force can be exerted: for example, comparing FIGS. 6 and 7 shows that the setting element 27 may be designed to be of varying width, so that the setting forces are also variable.

Figure 9:
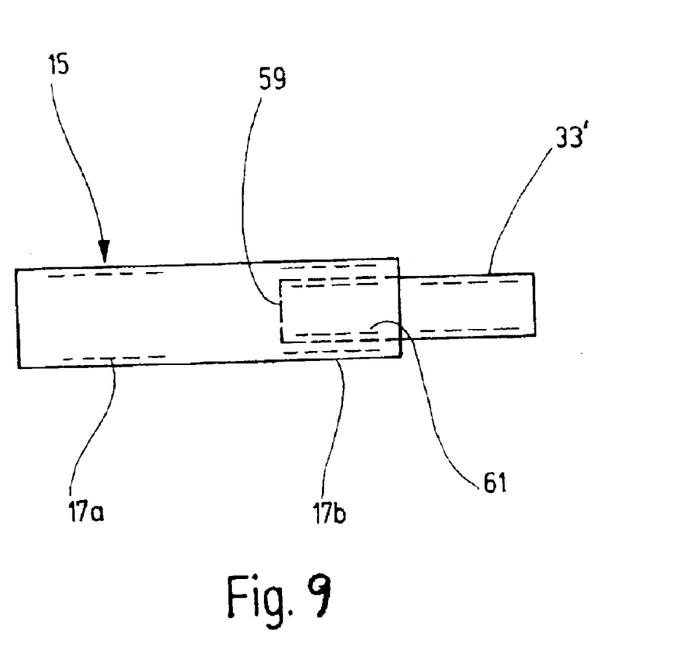
FIG. 9 shows part of a setting device.

FIG. 9 shows a modified exemplary embodiment of the clamping screw 15 described and shown in FIG. 1. This clamping screw 15 may have the thread sections 17a and 17b running in opposite directions. It is provided with a recess 59, into which an adjusting screw 33' is inserted. The latter is provided with an external thread 61, which meshes with an internal thread of the recess 59. As explained in the case of FIG. 1, the adjusting screw can be reached through an aperture 35 in the setting element 27 and can be screwed to a greater or lesser extent into the clamping screw 15. By the displacement of the adjusting screw 33', the bending of the setting element 27 can be influenced, given an appropriate length of the adjusting screw 33'. In the case of FIG. 9, it is also possible to provide the adjusting screw 33' on the outside with threaded sections running in opposite directions, of which one interacts with an internal thread in the region of the aperture 35 of the setting element 27 in order to ensure a positive movement of the setting element 27 for both reducing and increasing the bending radius.

The exemplary embodiment shown in FIG. 9 is distinguished by the fact that the adjusting device 31 can be adapted to various exemplary embodiments of a tool: depending on the arrangement of the setting element 27, adjusting screws 33' of greater or lesser length can be inserted into the clamping screw 15. In addition, if the adjusting screw 33' is damaged, it can easily be exchanged, since, unlike in the exemplary embodiment according to FIG. 1, it remains accessible even after the setting element 27 has been fastened to the parent body 3 of the tool 1: it is merely necessary to remove the clamping screw 15 in order to reach and exchange the adjusting screw 33'.

On the whole, it is found that the tool 1 and its setting device 23 are of compact and simple construction. Few parts are required in order to set the radial position of one or more cutting tips. In this case, no frictional forces occur in the setting element 27 when the latter is displaced. During the setting of the cutting edges, therefore, only a deformation of the setting element occurs, not a relative movement of the same relative to the parent body of the tool. The wedge mechanism provided in conventional tools is thus dispensed with. This promotes a very sensitive and uniform setting of the cutting edges, it being possible for different displacement distances of the cutting edges to also be realized here. In addition, it is possible to carry out the setting in a reversible manner, thus to also effect a reverse displacement of the cutting edges with one and the same setting element. At the same time, the tool is of robust and simple construction, and can thus be realized in a cost-effective manner.

The setting element 27 can be adapted to a wide variety of embodiments of the tool 1. The latter may have one or more cutting edges and also one or more guide strips. The sections of the wall region 21 which are to be displaced during the setting can be specifically selected by appropriate configuration of the setting element 27, a factor which becomes especially clear from the explanations with respect to FIGS. 4 and 5. In all cases, a very sensitive setting is possible by virtue of the fact that the adjusting screw 33, 33' can be provided with a fine thread, so that the tool and the associated setting device 23 can also be used in the fine machining and superfinishing of workpieces.

It is also especially advantageous that the setting device 23 can preferably be designed in such a way that the setting element 27 is deformed only in a reversible manner, so that a reverse displacement of the cutting edges and cutting tips is possible without great effort. In addition, the wear of the setting device 23 is very low, so that it has very high durability.

Although the present invention has been described in relation to particular embodiments thereof, many other variations and modifications and other uses will become apparent to those skilled in the art. Therefore, the present invention is not limited by the specific disclosure herein.

What is claimed is:

1. A tool for machining workpieces, having a parent body, having at least one cutting edge projecting beyond a circumferential surface of the parent body, and having a setting device that sets a radial distance of the at least one cutting edge from a center axis of the parent body, wherein the setting device has a setting element, and an adjusting device which can be actuated to vary bending of the setting element, and wherein the setting element is disposed in the parent body of the tool in such a way that, when the bending of the setting element is varied from an initial position, the radial distance of said at least one cutting edge is varied from an initial position, wherein the adjusting device comprises an adjusting screw.

2. The tool as claimed in claim 1, wherein the setting element is planar in said initial position.

3. The tool as claimed in claim 1, wherein the setting element is curved in said initial position.

4. The tool as claimed in claim 1, wherein the parent body of the tool has an abutment which supports the setting element so as to prevent displacement of the setting element in a direction along the center axis when the adjusting device is actuated.

5. The tool as claimed in 4, wherein the abutment comprises a welded connection between the setting element and the parent body.

6. The tool as claimed in claim 1, wherein the setting element is made of spring steel.

7. The tool as claimed in claim 1, wherein the tool has a plurality of said at least one cutting edge, and the bending of the setting element sets the radial distance of more than one cutting edge of the tool.

8. The tool as claimed in 7, wherein the bending of the setting element sets the radial distance of all of the plurality of cutting edges of the tool.

9. The tool as claimed in claim 1, wherein the radial distance of the at least one cutting edge can be either increased or reduced from said initial position by the setting element.

10. The tool as claimed in claim 1, wherein said setting element is capable of both increasing and reducing the radial distance of the cutting edge.

11. The tool as claimed in claim 1, wherein the adjusting device comprises both an adjusting screw and a clamping screw.

12. The tool as claimed in 3, wherein said setting element is initially curved convexly away from said parent body of said tool.

13. The tool as claimed in 3, wherein said setting element is initially curved concavely toward said parent body of said tool.

14. The tool as claimed in claim 1, wherein the radial distance of the at least one cutting edge can be reduced but not increased from said initial position by the setting element.

15. A tool for machining workpieces, having a parent body, having at least one cutting edge projecting beyond a circumferential surface of the parent body, and having a setting device that sets a radial distance of the at least one cutting edge from a center axis of the parent body;

wherein the setting device has a setting element, and an adjusting device which can be actuated to vary bending of the setting element;

wherein the setting element is disposed in the parent body of the tool in such a way that, when the bending of the setting element is varied from an initial position, the radial distance of said at least one cutting edge is varied from an initial position; and     wherein the setting element is planar in said initial position.

16. A tool for machining workpieces, having a parent body, having at least one cutting edge projecting beyond a circumferential surface of the parent body, and having a setting device that sets a radial distance of the at least one cutting edge from a center axis of the parent body;

wherein the setting device has a setting element, and an adjusting device which can be actuated to vary bending of the setting element;

wherein the setting element is disposed in the parent body of the tool in such a way that, when the bending of the setting element is varied from an initial position, the radial distance of said at least one cutting edge is varied from an initial position;

wherein the setting element is curved in said initial position; and     wherein said setting element is initially curved concavely toward said parent body of said tool.

\* \* \* \* \*

UNITED STATES PATENT AND TRADEMARK OFFICE
CERTIFICATE OF CORRECTION

PATENT NO. : 6,926,475 B2
DATED : August 9, 2005
INVENTOR(S) : Dieter Kress and Friedrich Häberle It is certified that error appears in the above-identified patent and that said Letters Patent is hereby corrected as shown below:

Title page,
Item [73], Assignee, should read -- MAPAL Fabrik für Präzisionswerkzeuge Dr. Kress KG --.

Signed and Sealed this

Eighth Day of November, 2005

JON W. DUDAS
*Director of the United States Patent and Trademark Office*